Dec. 18, 1951  P. SCHELL  2,578,949
OUT-FIRE CONTROL SWITCH
Filed Dec. 14, 1945
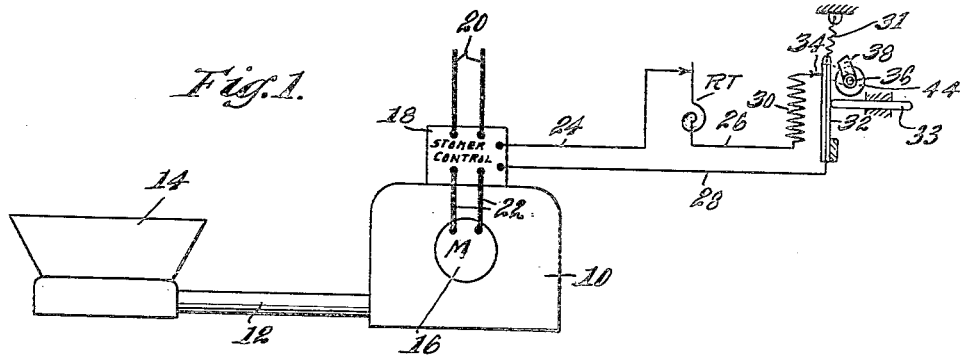
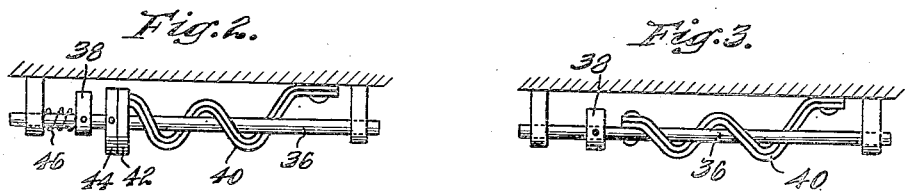
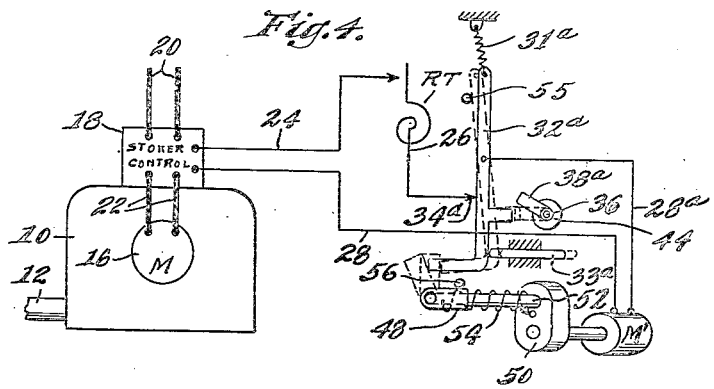
INVENTOR.
Paul Schell.
BY Bair & Freeman
Attys.

Patented Dec. 18, 1951

2,578,949

UNITED STATES PATENT OFFICE 2,578,949

OUT-FIRE CONTROL SWITCH

Paul Schell, Elkhart, Ind., assignor to Penn Electric Switch Co., Goshen, Ind., a corporation of Iowa Application December 14, 1945, Serial No. 635,051

1 Claim. (Cl. 200—33)

This invention relates to an out-fire control, or a control device that shuts down a stoker system in the event that a call for heat is had at a time when the fire is either out, or so low that it will not rekindle and burn properly in response to operation of the stoker.

One object of the invention is to provide an out-fire control that permits the stoker to operate for a predetermined time period before the out-fire control responds for the purpose of either shutting down the stoker or permitting it to run depending upon the condition of the fire at that time.

Another object is to provide an out-fire control which is more accurate in its response than types heretofore used wherein a thermostat responds to the temperature of the fire at the time a stoker operation is initiated, my invention on the other hand permitting the fire to operate for a time period after initiation of the stoker operation so that if it is then burning properly it will release the out-fire control to permit a normal operation, whereas if the fire is not operating properly at that time the out-fire control will come into action for shutting down the stoker.

More specifically it is an object of my invention to provide an out-fire control switch connected in the room thermostat circuit and normally closed, the out-fire control switch opening the room thermostat circuit after a time period following thermostat closure if the fire does not build up properly.

With these and other objects in view, my invention consists in the construction, arrangement and combination of the various parts of my out-fire control whereby the objects contemplated are attained, as hereinafter more fully set forth, pointed out in my claim and illustrated in the accompanying drawings, wherein:

Figure 1 is a diagrammatic view of an out-fire control embodying my invention and showing it in connection with a stoker and a stoker control circuit.

Figure 2 is a schematic view showing a combustion thermostat of the slip connection type that can be used in connection with my out-fire control.

Figure 3 is a similar view of a combustion thermostat that does not use a slip connection, and which is capable of use in connection with my out-fire control; and Figure 4 is a diagrammatic view of a modified arrangement utilizing an electric timing motor in place of a warp switch timer as shown in Figure 1 and a different combustion thermostat hookup.

On the accompanying drawing, I have used the reference numeral 10 to indicate a stoker which has the usual coal feed tube 12 extending to a burner head 14. The stoker is operated by an electric motor 16 in the usual manner, the motor being under control of a "stoker control" 18.

Current wires 20 supply current to the stoker control 18 and the control supplies current through wires 22 to a motor M when a control circuit of the stoker control is closed, and cuts off current to the motor when the control circuit is open, this being usual construction.

The control circuit mentioned includes a room thermostat RT and a plurality of wires such as 24, 26 and 28. Ordinarily the wires 26 and 28 are connected together (when there is no out-fire control provided), and in that case the room thermostat is the sole controlling device for operation of the stoker.

In other installations, it is now common practice to connect the wires 26 and 28 to a thermostat located in the combustion chamber or the stack of the furnace so that this switch is normally closed when the temperature of the fire is sufficient to permit proper stoker operation upon initiation of such by closure of the room thermostat. The setting of the thermostat however is quite critical and in many cases, especially where the thermostat is located in the stack, the temperature may be quite low due to a prolonged period of idleness, yet there may be sufficient fire in the burner head 14 to permit a proper stoker operation. In such case, the out-fire control of the prior art shuts down the stoker, thereby requiring a service call or manual control of the stoker, so that it will operate and bring the fire up to a satisfactory burning condition.

In order to eliminate the undesirable out-fire operations of this character, I provide a timing arrangement, which whether the fire is out or not, permits a stoker operation to determine this fact and bring the fire up to a suitable temperature (if it is so low that it would not keep the contacts in the usual out-fire control closed yet could be brought up by means of a few minutes operation) for continuing a stoker operating cycle.

My objects can be accomplished by a timing arrangement such as shown in Figures 1 and 2 wherein a heater 30 and a bimetal element 32 to be heated thereby are included in the circuit by connection with the wires 26 and 28 respectively. The bimetal 32 and a contact point 34 constitute a switch which is normally closed and which may be opened after a time period such as five minutes due to warping of the bimetal element 32 toward the right as a result of the heat from the heater 30. A toggle spring 31 is provided to retain the element 32 snapped toward the right once it has been warped to that position until manually reset by sliding a reset button 33 toward the left.

Associated with the bimetal element 32, is a combustion thermostat consisting of an actuating shaft 36, an actuating arm 38 and a bimetal element 40. The bimetal element may be located in the combustion chamber or stack of the furnace and the bimetal element may actuate the shaft 36 directly as shown in Figure 3, or through a slip connection as shown in Figure 2. The slip connection consists of a pair of discs 42 and 44, the disc 42 being driven by the bimetal element 40 as it winds or unwinds in response to a rise or decrease in temperature, and the disc 44 actuates the shaft 36 and the arm 38. The discs are held in frictional engagement as by a spring 46.

When the room thermostat RT closes, the heater 30 is energized for starting the timing period for the out-fire control, and if at the expiration of the time period the fire has built up enough to increase the temperature a certain number of degrees (with the type of thermostat shown in Figure 2) or to a certain degree (with the type of thermostat shown in Figure 3), then the shaft 36 will rotate counterclockwise and move to the dotted position shown in Figure 1 to hold the contacts 32 and 34 engaged, instead of permitting separation at the end of the timing period. Thus, I am always assured of an operating cycle of the stoker to determine whether there is enough fire to continue the stoker cycle or whether at the end of the timing period there has not been a build-up of temperature that would justify continuance of the cycle.

If the arm 38 stays in the full line position of Figure 1 due to insufficient stoker fire when stoked to raise the temperature around the bimetal 40, then the bimetal blade 32 will warp toward the right and the toggle spring 31 will hold the switch in open position until the trouble is remedied and the out-fire control is reset by pushing the button 33. Thus an unsafe condition of the fire effects a positive shut-down of the stoker.

The modified arrangement illustrated in Figure 4 includes a contact 34a and a contact arm 32a connected with the wires 26 and 28a, these contacts being normally engaged, and opened after a time period by a timing motor M'. The motor M', may drive a shaft 52 through a step-down gear box 50. The shaft 52 has an arm 48 thereon for rotating clockwise from the full line position and separating the contact arm 32a from the contact 34a after the arm rotates nearly three-fourths of a revolution (dot-and-dash line position) as a result of the motor and the step-down gearing running a period of time. If by that time the arm 38a of the combustion chamber or stack thermostat has moved to the dotted position it would stall the arm 48 in the dot-and-dash line position and thereby prevent opening of the contacts. Thus, with this arrangement the circuit may be maintained, thereby accomplishing the same results as with mechanical engagement of the arm 38 in Figure 1 with the bimetal 32 to prevent it from being separated from the contact 34.

If the arm 38a remains in its full line position, then the arm 48 will move to its dotted position and will effect movement of the arm 32a to its dotted position against a stop 55 for shut-down until manually reset by the reset button 33a is accomplished as in Figure 1.

When the room thermostat RT opens with the arrangement shown in Figure 4, then a spring 54 rotates the shaft 52 to return the arm 48 counterclockwise to its initial position against a stop 56.

While I have shown in Figures 2 and 3, a thermostat which may be used for preventing an out-fire operation (shut down of the stoker) by either of the methods shown in Figures 1 and 4, other temperature responsive devices may be substituted in place thereof such as a rate-of-change thermostat of the type shown in Fillo Patent No. 2,332,212, issued October 19, 1943.

Changes of this type and many others may be made without departing from the real spirit and purpose of my invention, and it is my intention to cover by my claim any modified forms of structure or use of mechanical equivalents which may be reasonably included within its scope without sacrificing any of the advantages thereof.

I claim as my invention:

A control structure of the character disclosed comprising an arm movable between two positions and having a switch in a circuit, an electric timing motor in said circuit, said switch being closed in one position of said arm, a toggle spring tending to retain it closed, an element rotated by said motor for engaging said switch arm and thereby opening said switch against the action of said toggle spring after a time period, said toggle spring thereupon tending to retain said switch open, said element and the motor being spring returned when the motor is deenergized, a condition responsive element for blocking the opening movement of said switch arm by said motor rotated element if said condition responsive element responds to its respective condition before the timing period represented by the movement of said motor rotated element from initial position to engagement with said switch arm has expired, and manual means to reset said control structures by returning said switch to its normally closed position.

PAUL SCHELL.

REFERENCES CITED

The following references are of record in the file of this patent:

UNITED STATES PATENTS

| Number | Name | Date |
|---|---|---|
| 1,666,331 | Fischer et al. | Apr. 17, 1928 |
| 2,174,275 | Raney | Sept. 26, 1939 |
| 2,185,317 | Schmieding | Jan. 2, 1940 |
| 2,185,752 | Raney | Jan. 2, 1940 |
| 2,373,150 | Tate | Apr. 10, 1945 |
| 2,377,535 | Wilson | June 5, 1945 |
| 2,385,811 | Hotchkiss | Oct. 2, 1945 |
| 2,472,398 | Berger | June 7, 1949 |